United States Patent
Kamijo (10) Patent No.: US 12,503,105 B2
(45) Date of Patent: Dec. 23, 2025

(54) DRIVE ASSIST DEVICE

(71) Applicant: TOYOTA JIDOSHA KABUSHIKI KAISHA, Toyota (JP)

(72) Inventor: Kentaro Kamijo, Susono (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 59 days.

(21) Appl. No.: 18/655,462

(22) Filed: May 6, 2024

(65) Prior Publication Data

US 2025/0074400 A1    Mar. 6, 2025

(30) Foreign Application Priority Data

Sep. 5, 2023 (JP) ................................. 2023-143726

(51) Int. Cl.
*B60W 30/09* (2012.01)
*G08G 1/16* (2006.01)

(52) U.S. Cl.
CPC ............ *B60W 30/09* (2013.01); *G08G 1/166* (2013.01); *B60W 2520/04* (2013.01); *B60W 2520/105* (2013.01); *B60W 2554/4029* (2020.02); *B60W 2554/80* (2020.02)

(58) Field of Classification Search
CPC ................. B60W 30/09; B60W 30/17; B60W 2554/4029; B60W 2520/04; B60W 2520/105; B60W 2554/80; B60W 2520/10
See application file for complete search history.

(56) References Cited

U.S. PATENT DOCUMENTS

| 8,355,851 | B2 | 1/2013 | Inoue et al. |
| 8,370,040 | B2 | 2/2013 | Inoue et al. |
| 8,417,430 | B2 | 4/2013 | Saeki |
| 8,548,709 | B2 | 10/2013 | Morita |
| 8,768,597 | B2 | 7/2014 | Kagawa |
| 9,174,643 | B2 | 11/2015 | Aso |
| 10,017,178 | B2 | 7/2018 | Morimoto et al. |
| 10,118,617 | B2 | 11/2018 | Urano et al. |
| 10,486,698 | B2 | 11/2019 | Masui et al. |
| 12,344,238 | B2 * | 7/2025 | Cho ...................... B60W 10/04 |
| 2019/0295419 | A1 | 9/2019 | Tosa et al. |
| 2023/0303065 | A1 * | 9/2023 | Cho ...................... B60W 30/09 |

FOREIGN PATENT DOCUMENTS

WO    2022/044264 A1    3/2022

\* cited by examiner

*Primary Examiner* — Tarek Elarabi
(74) *Attorney, Agent, or Firm* — SoraIP, Inc.

(57) ABSTRACT

The control unit for controlling the travel control device causes the host vehicle to decelerate and stop at a predetermined position in front of the host vehicle when a stop target is detected in front of the host vehicle, and further. The control unit estimates a time period from when the subject vehicle catches up with the pedestrian until when the subject vehicle stops and a time period from when the subject vehicle stops until when the pedestrian catches up with the subject vehicle when the subject vehicle is less than the reference value when the sum of the two times is less than the reference value, maintains the subject vehicle in the stop state even if the subject vehicle is not detected.

5 Claims, 5 Drawing Sheets

DRIVE ASSIST DEVICE

CROSS-REFERENCE TO RELATED APPLICATION

This application claims priority to Japanese Patent Application No. 2023-143726 filed on Sep. 5, 2023, incorporated herein by reference in its entirety.

BACKGROUND

1. Technical Field

The present disclosure relates to a drive assist device for a vehicle such as an automobile.

2. Description of Related Art

As a drive assist device for a vehicle such as an automobile, there is well known a drive assist device including a target detection device and a control unit. The target detection device detects a target around the host vehicle. The control unit automatically controls travel of the host vehicle based on the detection result from the target detection device.

In a drive assist device described in WO 2022/044264, for example, a target detection device detects a target in front of a vehicle. In addition, a control unit is configured to extend the detection range of the target detection device in the vehicle width direction when the vehicle is stopped, as compared with when the vehicle is traveling.

According to this type of drive assist device, when a signal ahead turns red while the vehicle is traveling, the vehicle is automatically decelerated, and the vehicle is temporarily stopped before the signal. In this situation, further, the range in which the target detection device detects a target can be extended in the vehicle width direction. Therefore, it is possible to detect not only a target in front of the vehicle but also a target at a side in front of the vehicle, and thus it is possible to improve the possibility of detecting an object or the like that comes to the front of the vehicle from a side of the vehicle. Therefore, it is possible to improve safety at the time when the signal turns green and the vehicle starts to travel.

SUMMARY

When a vehicle and a pedestrian move on a narrow road, the distance between the vehicle and the pedestrian tends to be short. For example, there may be a case where a vehicle passes a pedestrian moving in the same direction and is temporarily stopped before a traffic light, and the vehicle starts to travel when the traffic light turns green after the pedestrian passes the vehicle in the stopped state. When the distance between the vehicle and the pedestrian at the time when the vehicle starts to travel is short, the driver and the pedestrian may be deprived of a sense of security. This issue cannot be addressed by the drive assist device described in WO 2022/044264.

There may be a situation in which the distance between a vehicle moving on a road in the same direction as a pedestrian and the pedestrian is short when the vehicle is temporarily stopped and thereafter starts to travel. The present disclosure provides a drive assist device improved to be able to reduce the risk of impairing the sense of security of a driver and a pedestrian even in such a situation.

An aspect of the present disclosure provides a drive assist device (100) including: a target detection device (18) that detects a target around a host vehicle (102); a travel control device (80) that controls travel of the host vehicle; and a control unit (10) that controls the travel control device, in which the control unit is configured to decelerate the host vehicle and stop the host vehicle at a predetermined position (120) before a temporary stop target (such as a red traffic light 116) (S60) by controlling the travel control device when the target detection device detects the temporary stop target in front of the host vehicle (S50).

The control unit (10) is configured to estimate a first time period (t1) since when the host vehicle (102) catches up with a pedestrian (112) until when the host vehicle is stopped (S230) and estimate a second time period (t2) since when the host vehicle is stopped until when the pedestrian catches up with the host vehicle (S240) when the target detection device (18) detects a temporary stop target (red traffic light 116) in front of the host vehicle and detects a pedestrian moving at a side in front of the host vehicle in a same direction as the host vehicle (S210, S220), and to maintain the host vehicle in a stopped state (S260, S270, S100, S120) by controlling the travel control device (80), even if the target detection device does not detect the temporary stop target any more, when a sum (t1+t2) of the first and second time periods is less than a first reference value (tc1) (S250).

According to the above configuration, the first time period and the second time period are estimated when the target detection device detects a temporary stop target in front of the host vehicle and detects a pedestrian moving at a side in front of the host vehicle in the same direction as the host vehicle. Further, the host vehicle is maintained in a stopped state, even if the target detection device does not detect the temporary stop target any more, when the sum of the first and second time periods is less than the first reference value.

Therefore, the host vehicle does not start to travel, even if the temporary stop target is not detected any more, when the sum of the first and second time periods is small. That is, the host vehicle does not start to travel, even if the temporary stop target is not detected any more, when the time period since when the host vehicle catches up with the pedestrian until when the pedestrian catches up with the host vehicle is short and the distance between the vehicle and the pedestrian is short. Therefore, it is possible to suppress the host vehicle starting to travel in a situation in which the distance between the vehicle and the pedestrian is short. Accordingly, it is possible to reduce the possibility that the driver and the pedestrian are deprived of a sense of security due to the host vehicle starting to travel in a situation in which the distance between the vehicle and the pedestrian is short.

In one aspect of the present disclosure, the control unit (10) may be configured to estimate a third time period (t3) until the host vehicle (102) catches up with the pedestrian (112) when the target detection device (18) does not detect the temporary stop target (such as a red traffic light 116) any more in a situation in which the host vehicle is maintained in the stopped state and the target detection device is detecting the pedestrian at a side in front of the host vehicle, and to continue to maintain the host vehicle in the stopped state (S290) when the third time period is less than a second reference value (tc2).

According to the above aspect, the stopped state of the host vehicle is continued when the third time period until the host vehicle catches up with the pedestrian is less than the second reference value. Therefore, it is possible to reduce the risk of impairing the sense of security of the driver and the pedestrian due to the vehicle starting to travel in a situation in which the distance between the vehicle and the pedestrian moving in front of the vehicle is short.

In another aspect of the present disclosure, the control unit (10) may be configured (S190) to estimate a first distance (L1) from a position of the host vehicle (102) at a time when the vehicle catches up with the pedestrian (112) to the predetermined position (120) (S140), and estimate the first time period (t1) based on a vehicle speed (V) at the time when the host vehicle catches up with the pedestrian, a deceleration of the host vehicle, and the first distance (S240).

In still another aspect of the present disclosure, the control unit (10) may be configured to estimate a moving speed (Vp) of the pedestrian (112), estimate a second distance (L2) from the pedestrian to the host vehicle at a time when the host vehicle is stopped, and estimate the second time period (t2) based on the moving speed of the pedestrian and the second distance (S240).

In still another aspect of the present disclosure, the control unit (10) may be configured to control the travel control device such that a vehicle speed of the host vehicle (102) is varied in a variation pattern set in advance (S40) when the target detection device (18) does not detect the temporary stop target any more in a situation in which the host vehicle is maintained in the stopped state and the target detection device is detecting the pedestrian (112) at a side in front of the host vehicle, and configured to estimate a third distance (L3) from the host vehicle to the pedestrian at a time when the target detection device does not detect the temporary stop target (such as a red traffic light 116) any more, and estimate the third time period (t3) based on the variation pattern, a moving speed of the pedestrian, and the third distance (S280).

In the present application, the "temporary stop target" means a target that exists ahead of the vehicle traveling and that requests a temporary stop of the vehicle. For example, the "temporary stop target" may be a red traffic light. Alternatively, the "temporary stop target" may be a crosswalk with no traffic light that can be crossed by a pedestrian, for example. Further, the "temporary stop target" may be a road sign (including a road mark) for a temporary stop such as "Stop" and a preceding vehicle that is temporarily stopped before such a road sign, for example.

Other objects, other features, and accompanying advantages of the present disclosure will be readily understood from the description of embodiments of the present disclosure made with reference to the following drawings.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

Hereinafter, a drive assist device according to an embodiment of the present disclosure will be described in detail with reference to the accompanying drawings.

Figure 1:
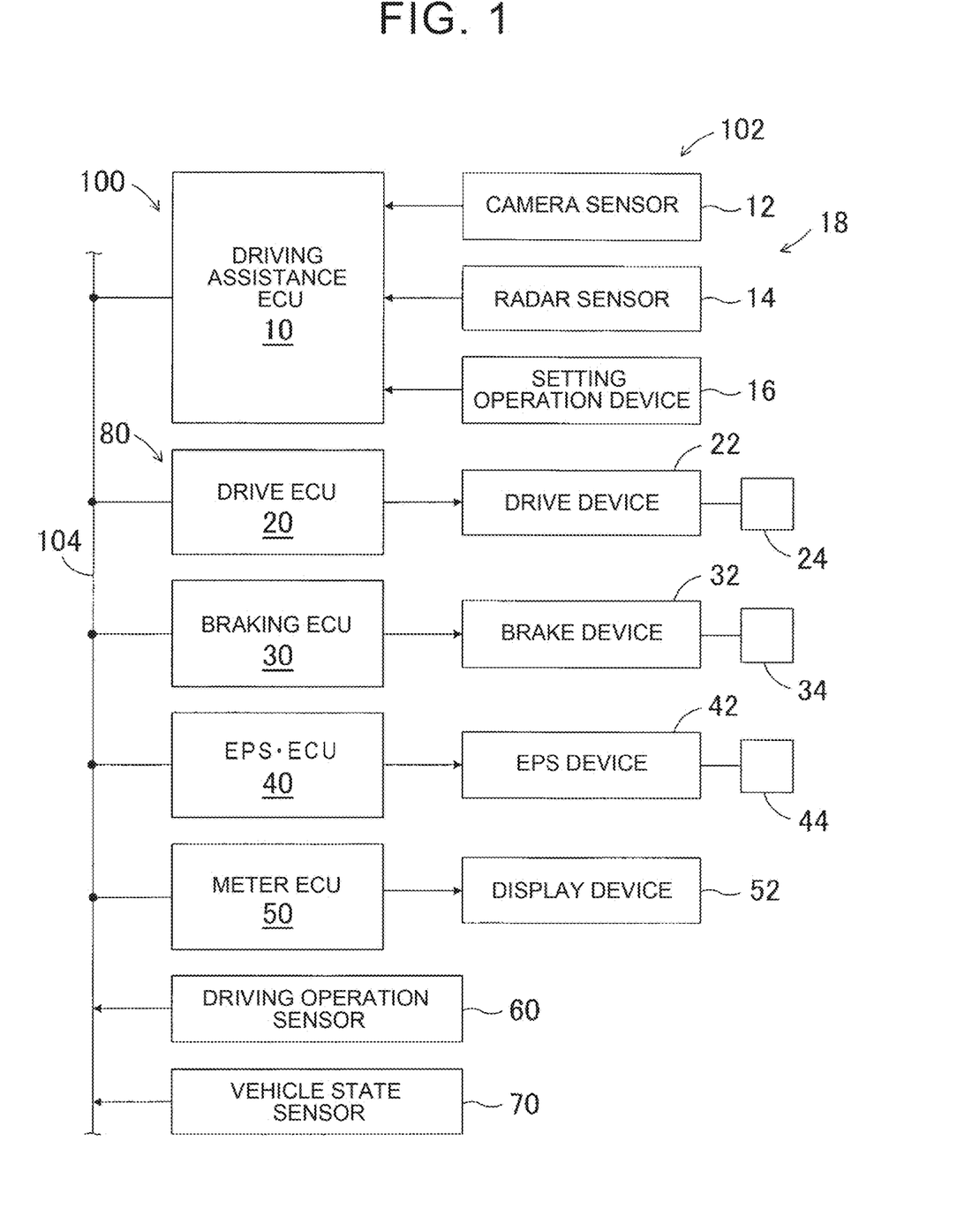
FIG. 1 is a schematic configuration diagram illustrating a drive assist device according to an embodiment.

As shown in FIG. 1, a drive assist device 100 according to an embodiment of the present disclosure is applied to vehicles 102 and includes a driving assistance ECU 10. The vehicle 102 is a vehicle capable of automated driving, and includes a drive ECU 20, a braking ECU 30, an electric power steering ECU 40, and a meter ECU 50. The ECU means an electronic control unit provided with a microcomputer as its main unit. In the following explanation, the electric power steering is referred to as a EPS.

A microcomputer of each ECU includes a central processing unit (CPU), a read-only memory (ROM), a random access memory (RAM), a readable and writable non-volatile memory (N/M), an interface (I/F), and the like. The CPU realizes various functions by executing instructions (programs, routines) stored in the ROM. Further, these ECUs are connected to each other such that data is exchangeable (communicable) via a controller area network (CAN) 104. Therefore, detected values of sensors (including switches) connected to a specific ECU are transmitted to other ECUs as well.

The driving assistance ECU 10 is a central control device that executes driving assistance control such as adaptive cruise control and lane keeping control. In an embodiment, the driving assistance ECU 10 cooperates with other ECU to perform stopping and starting control and flag control as part of the following vehicle-to-vehicle distance control, as will be described further below. The following vehicle-to-vehicle distance control is referred to as an ACC (adaptive cruise control).

A camera sensor 12, a radar sensor 14, and a setting operation device 16 are connected to the driving assistance ECU 10. The camera sensor 12 and radar sensor 14 each include a plurality of camera devices and a plurality of radar devices. The camera sensor 12 and the radar sensor 14 function as a target detection device 18 that detects a target around the vehicle 102.

Each camera device of the camera sensor 12 includes a camera unit and a recognition unit. However, the camera unit and the recognition unit are not shown in the figure. The camera unit captures an image of the surroundings of the vehicle 102. The recognition unit analyzes image data obtained by photographing by the camera unit and recognizes targets such as white lines, traffic lights, road signs, and other vehicles on the road. The recognition unit supplies information about the recognized target to the driving assistance ECU 10 at predetermined intervals.

Each radar device of the radar sensor 14 includes a radar transceiver and a signal processor (not shown). The radar transmitting/receiving unit emits a radio wave (hereinafter, referred to as "millimeter wave") in a millimeter wave band, and receives a millimeter wave (that is, a reflected wave) reflected by a three-dimensional object (for example, another vehicle, a pedestrian, or the like) existing in a radiation range. The driving assistance ECU 10 is configured to determine a distance between the vehicle and the three-dimensional object, a relative speed between the vehicle and the three-dimensional object, a relative position (direction) of the three-dimensional object with respect to the vehicle, and the like. The processing of the signal processing unit is performed on the basis of a phase difference between the transmitted millimeter wave and the received reflected wave, an attenuation level of the reflected wave, a time from the transmission of the millimeter wave until the reception of the reflected wave, and the like. A light detection and ranging (LiDAR) may be used instead of the radar sensor 14.

The setting operation device 16 is provided at a position that can be operated by a driver, such as a steering wheel (not shown in FIG. 1), and is operated by the driver. Although not shown in FIG. 1, the setting operation device 16 includes a ACC switch. The driving assistance ECU 10 executes ACC when ACC is switched on, as will be described further below.

A drive device 22 that accelerates the vehicles 102 by applying a driving force to the driving wheels 24 is connected to the drive ECU 20. The drive ECU 20 normally controls the drive device 22 such that a driving force generated by the drive device 22 changes in accordance with a driving operation by the driver, and controls the drive device 22 based on a command signal when the drive ECU 20 receives the command signal from the driving assistance ECU 10.

A braking device 32 is connected to the braking ECU 30 to decelerate the vehicles 102 by braking by applying a braking force to the wheels 34. The braking ECU 30 controls the braking device so that the braking force generated by the braking device 32 changes in response to a braking operation by the driver in a normal state. In addition, upon receiving the command signal from the driving assistance ECU 10, the braking ECU 30 performs the automated braking by controlling the braking device 32 based on the command signal. When the braking force is applied to the wheels, a brake lamp (not shown in FIG. 1) is lit.

An EPS device 42 is connected to the EPS-ECU 40. EPS-ECU 40 controls the steering assist torque by controlling EPS device 42, thereby reducing the steering burden on the driver. The control of EPS device 42 is performed in a manner known in the art on the basis of the steering torque Ts and the vehicle speed V detected by the driving operation sensor 60 and the vehicle state sensor 70 described later. EPS-ECU 40 can steer the steered wheels 44 as needed by controlling EPS device 42. Therefore, EPS-ECU 40 and EPS device 42 functions as an automatic steering device that automatically steers steered wheels as needed.

As can be seen from the above explanation, the drive ECU 20, the drive device 22, the braking ECU 30, the braking device 32, EPS-ECU 40, and EPS device 42 function as a travel control device 80 that controls travel of the vehicle 102 such as braking and turning.

The meter ECU 50 is connected with a touch panel type display device 52 that displays a state of control by the driving assistance ECU 10 and the like. The display device 52 may be, for example, a multi-information display in which meters and various types of information are displayed, and may be a display of the navigation device 0, which is not shown in the figure. When receiving a command from the driving assistance ECU 10, the display device 52 displays the status of ACC.

The driving operation sensor 60 and the vehicle state sensor 70 are connected to the CAN 104. Information detected by the driving operation sensor 60 and the vehicle state sensor 70 (hereinafter referred to as sensor information) is transmitted to the CAN 104. The sensor information transmitted to the CAN 104 can be appropriately used in each ECU. Note that the sensor information may be information of a sensor connected to a specific ECU, and may be transmitted from the specific ECU to the CAN 104.

The driving operation sensor 60 includes a driving operation amount sensor, a braking operation amount sensor, and a brake switch. The driving operation amount sensor detects an operation amount of the accelerator pedal. The braking operation amount sensor detects a pedaling force with respect to the master cylinder pressure or the brake pedal. The brake switch detects whether or not the brake pedal is operated. Further, the driving operation sensor 60 includes a steering angle sensor that detects the steering angle θ, a steering torque sensor that detects the steering torque Ts, and the like.

The vehicle state sensor 70 includes a vehicle speed sensor, a longitudinal acceleration sensor, a lateral acceleration sensor, a yaw rate sensor, and the like. The vehicle speed sensor detects the vehicle speed V of the vehicle 102. The longitudinal acceleration sensor detects acceleration in the longitudinal direction of the vehicle. The lateral acceleration sensor detects lateral acceleration of the vehicle. The yaw rate sensor detects a yaw rate of the vehicle.

Figure 2:
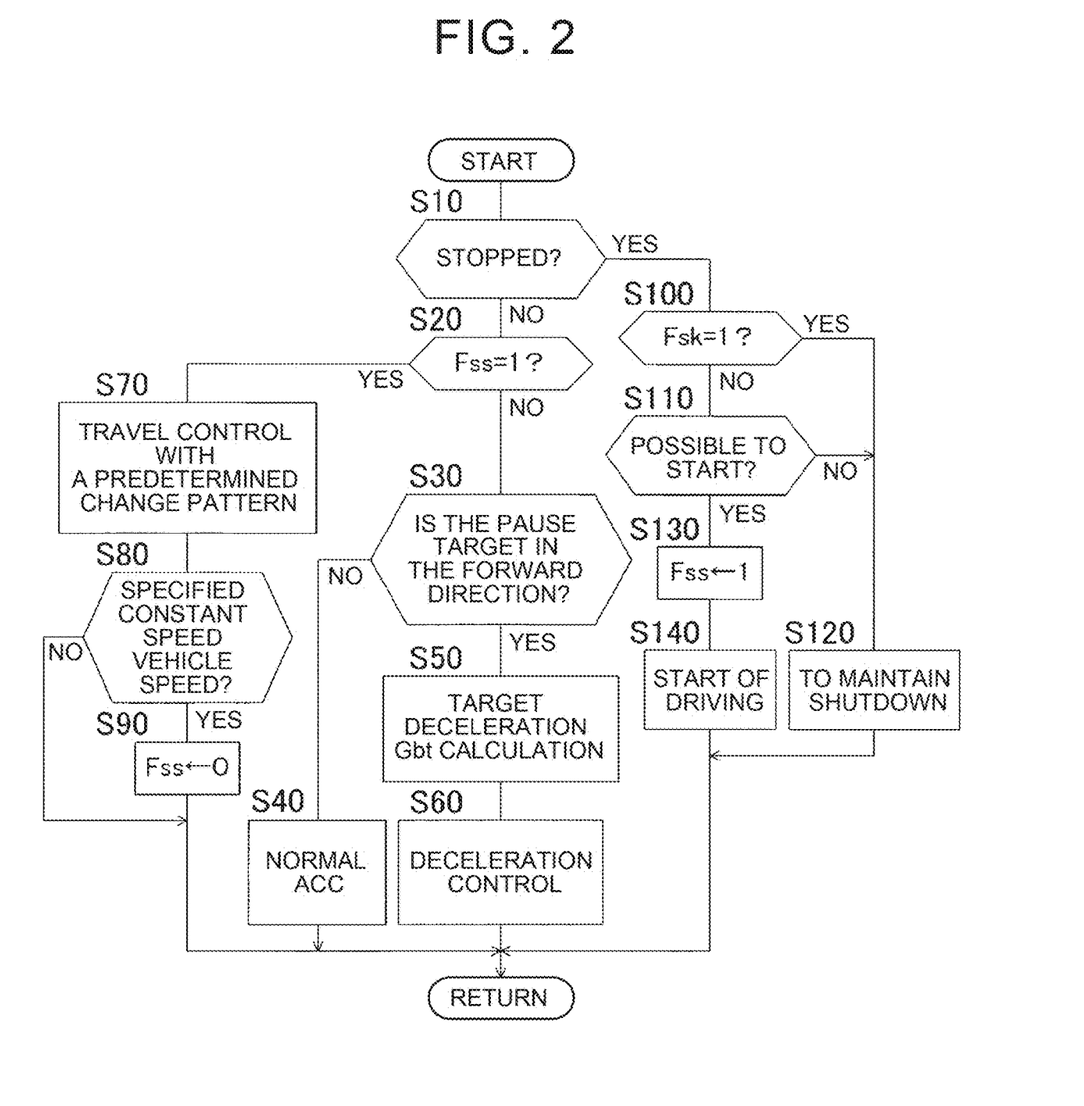
FIG. 2 is a flowchart of stopping and starting control in the embodiment.
Figure 3:
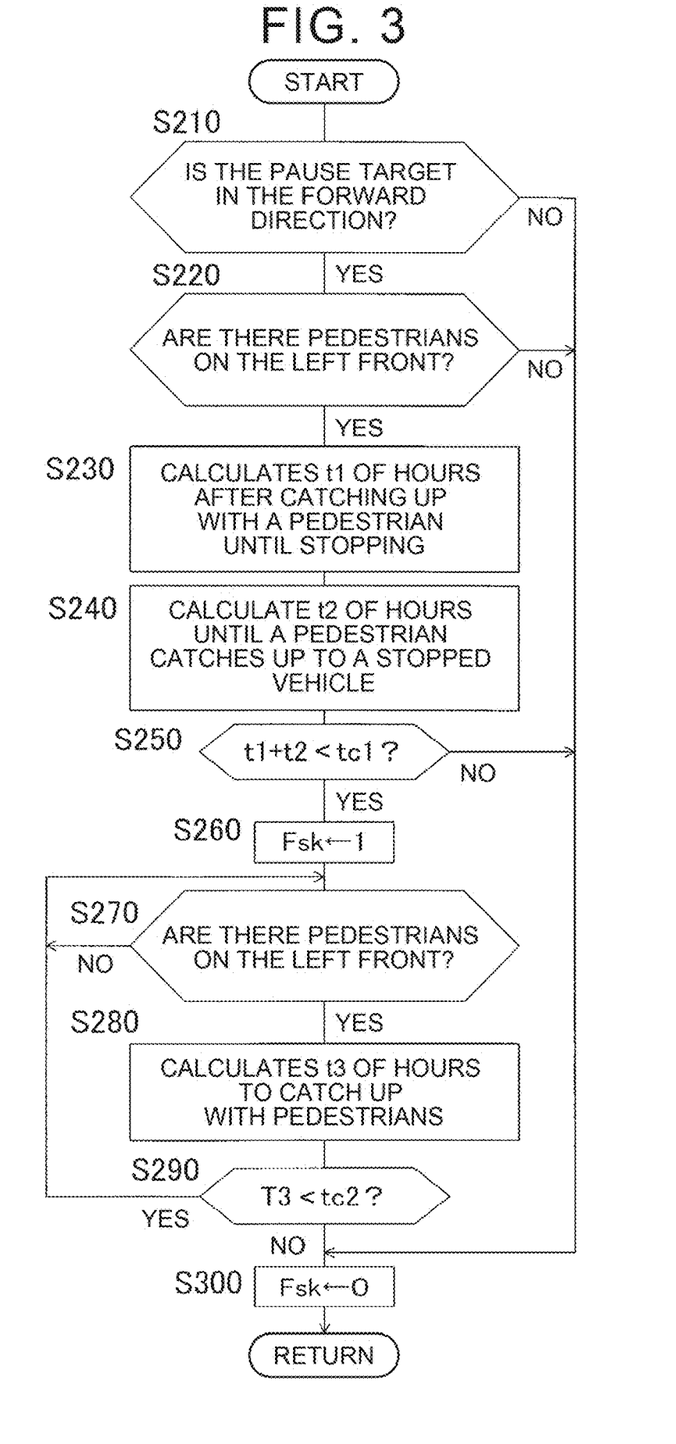
FIG. 3 is a flowchart of flag control in the embodiment.

In the embodiment, ROM of the driving assistance ECU 10 stores a stop/start control program corresponding to the flowchart illustrated in FIG. 2 and a flag control program corresponding to the flowchart illustrated in FIG. 3. CPU of the driving assistance ECU 10 performs driving assistance by controlling stopping and starting and executing flag control in accordance with these programs.

Stop and Start Control (FIG. 2)

Next, the stop and start control in the embodiment will be described with reference to the flowchart shown in FIG. 2. The stopping and starting control according to the flow chart shown in FIG. 2 is repeatedly executed at predetermined intervals by CPU of the driving assistance ECU 10 when ACC switch of the setting operation device 16 shown in FIG. 1 is on. Note that the flag Fss is reset to 0 at the beginning of the control according to the flow chart shown in FIG. 2.

First, in S10, CPU determines whether or not the vehicles 102 are stopped based on data from the travel control device 80. CPU advances the present control to S100 when an affirmative determination is made, and advances the present control to S20 when a negative determination is made.

In S20, CPU determines whether or not the flag Fss is 1, that is, whether or not the vehicle is traveling after the vehicle 102 is temporarily stopped. CPU advances the present control to S70 when an affirmative determination is made, and advances the present control to S30 when a negative determination is made.

In S30, CPU determines whether or not there is a pause target in front of the vehicle 102 by determining whether or not a pause target is detected in front of the vehicle 102 by the target detection device 18. CPU advances the present control to S50 when an affirmative determination is made, and advances the present control to S40 when a negative determination is made.

In S40, CPU performs normal ACC, i.e., constant speed travel control and preceding vehicle follow-up control. The constant speed travel control is control for adjusting the acceleration/deceleration of the vehicle so that the travel speed of the vehicle 102 coincides with the target speed (set speed) without requiring an acceleration/deceleration operation by the driver. The preceding vehicle following control is a control for causing the own vehicle to follow the following target vehicle while maintaining the inter-vehicle distance between the preceding vehicle (the following target vehicle) and the own vehicle 102 at the target inter-vehicle distance without requiring an acceleration/deceleration operation by the driver.

In S50, CPU calculates a target deceleration Gbt for stopping the vehicles 102 at a predetermined position. The calculation of the target deceleration Gbt is performed based on the distance L12 (see FIG. 6) and the vehicle speed V of the vehicle 102. The distance L12 is a distance from the vehicle 102 to a predetermined position in front of the pause target detected by the target detection device 18. The predetermined position in front of the pause target may be set in advance for each pause target.

In S60, CPU controls the deceleration of the vehicle 102 to be in the target deceleration Gbt by outputting a command signal for controlling the deceleration of the vehicle 102 to the target deceleration Gbt to the travel control device 80.

Figure 4A:
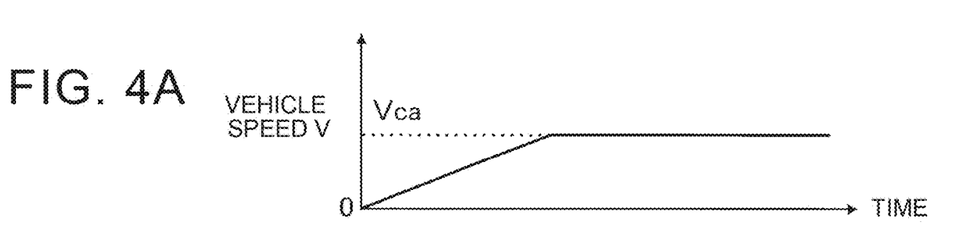
FIG. 4A is a diagram illustrating a variation pattern of a vehicle speed when the vehicle starts after the vehicle is temporarily stopped.
Figure 4B:
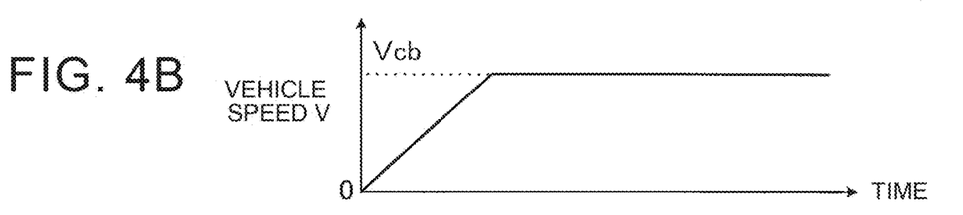
FIG. 4B illustrates another variation pattern of a vehicle speed when a vehicle starts after the vehicle is temporarily stopped.
Figure 5:
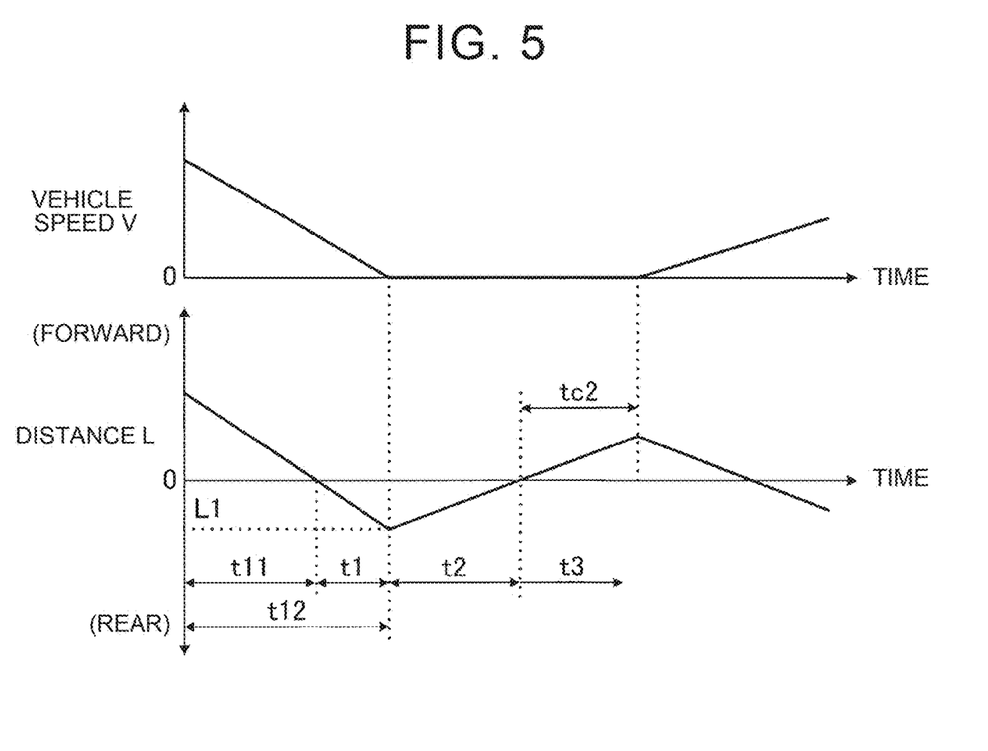
FIG. 5 is a diagram illustrating an exemplary change in vehicle speed and a change in distance between a vehicle and a pedestrian.

In S70, CPU controls the travel of the vehicle 102 by outputting to the travel control device 80 a command signal for controlling the vehicle speed V of the vehicle 102 so as to change in the predetermined change pattern A shown in FIG. 4A. The acceleration and the constant speed vehicle speed Vca (positive constant) of the predetermined change pattern A are smaller than the acceleration and the constant speed vehicle speed Vcb (positive constant) of the predetermined change pattern B in the normal ACC shown in FIG. 4B.

In S80, CPU determines whether or not the vehicle speed V of the vehicle 102 has reached the constant speed vehicle speed Vca. CPU ends the present control once when a negative determination is made, and resets the flag Fss to 0 in S90 when an affirmative determination is made, and then ends the present control once.

In S100, CPU determines whether or not the flag Fsk is 1, i.e., whether or not the vehicles 102 should be kept stopped. CPU advances the present control to S120 when an affirmative determination is made, and advances the present control to S110 when a negative determination is made.

In S110, CPU determines whether or not the vehicles 102 may be launched. CPU advances the present control to S130 when an affirmative determination is made, and advances the present control to S120 when a negative determination is made. Note that it may be determined that the vehicle may be started when there is no primary stop target in front of the vehicle 102 and there is no obstacle such as a stopped vehicle in front of the vehicle 102, such as when the traffic light changes from red to blue.

In S120, CPU outputs a command signal to the travel control device 80 to keep the vehicle 102 in a stopped condition, and then ends the present control once.

In S130, CPU sets the flag Fss to 1, and in S140, CPU starts traveling of the vehicles 102 by outputting a command signal to the travel control device 80, and then ends this control once.

Flag Control (FIG. 3)

Next, the control of the flag Fsk in the embodiment will be described referring to the flow chart shown in FIG. 3. The control of the flag Fsk according to the flow chart shown in FIG. 3 is repeatedly executed at predetermined intervals by CPU of the driving assistance ECU 10 when ACC of the setting operation device 16 shown in FIG. 1 is on. The flag Fsk is reset to 0 at the beginning of the control according to the flow chart shown in FIG. 3.

First, in S210, similarly to S30, CPU determines whether or not there is a pause target in front of the vehicle 102 by determining whether or not a pause target is detected in front of the vehicle 102 by the target detection device 18. CPU advances the present control to S300 when a negative determination is made, and advances the present control to S220 when an affirmative determination is made.

In S220, CPU determines whether or not there is a pedestrian moving in the same direction as the vehicle in front of the left side of the vehicle 102 by determining whether or not a pedestrian is detected in front of the left side of the vehicle 102 by the target detection device 18. CPU advances the present control to S300 when a negative determination is made, and advances the present control to S230 when an affirmative determination is made.

In S230, CPU estimates the distance L11 between the vehicles 102 and the pedestrian (see FIG. 6) and the moving speed Vp of the pedestrian. Further, CPU calculates a time t11 until the vehicle 102 catches up with the pedestrian based on the distance L11, the moving speed Vp of the pedestrian, the vehicle speed V of the vehicle 102, and the target deceleration Gbt. Further, CPU estimates a distance L12 from the vehicle 102 to a predetermined position 120 (see FIG. 6) in front of the traffic light 116, and calculates a time t12 until the vehicle 102 is stopped based on the vehicle speed V, the target deceleration of the host vehicle, and the distance L12. Further, CPU calculates a first time t1 (=t12-t11) from when the vehicle 102 catches up with the pedestrian to when the vehicle is stopped based on the time t11 and t12.

The first time t1 may be estimated based on the vehicle speed V when the host vehicle catches up with the pedestrian, the target deceleration of the host vehicle, and the estimated first distance L1. The first distance L1 is a first distance from the position of the subject vehicle 102 to the predetermined position 120 when the subject vehicle catches up with the pedestrian 112.

In S240, CPU estimates a distance L2 between the vehicle and the pedestrian when the vehicle 102 is stopped and a moving speed Vp of the pedestrian. Further, CPU calculates a second time t2 (=L2/Vp) until the pedestrian catches up with the stopped vehicle 102 based on the distance L2 and the moving speed Vp of the pedestrian.

In S250, CPU determines whether or not the vehicle 102 should be kept stopped by determining whether or not the sum t1+t2 of the first time t1 and the second time t2 is less than the first reference tc1 (positive constant). When a negative determination is made, CPU advances the present control to S300, and when an affirmative determination is made, S260 sets the flag Fsk to 1, and then advances the present control to S270.

In S270, CPU determines whether or not a pedestrian is detected in front of the left side of the vehicle 102 by the target detection device 18 as in S220. Thus, CPU determines whether or not there is a pedestrian moving in the same direction as the vehicle in front of the left side of the vehicle 102. When a negative determination is made, CPU repeatedly executes S270, and when an affirmative determination is made, the control proceeds to S280. When the determination in S270 is a negative determination over a preset determination reference time (positive constant) or more, such as when the pedestrian deviates to the side road, the present control may be advanced to S300.

In S280, CPU estimates the distance L3 (see FIG. 6) between the stopped vehicles 102 and the pedestrian. Further, CPU calculates a third t3 of times from when the pedestrian catches up with the stopped vehicle 102 until the vehicle 102 catches up with the pedestrian. The calculation of the third temporal t3 is performed on the basis of the distance L2, the moving speed Vp of the pedestrian, and the vehicle speed V of the vehicle 102 that changes in the predetermined change pattern A shown in FIG. 4A.

In S290, CPU determines whether or not the vehicles 102 should be kept stopped by determining whether or not the third time t3 is less than the second reference tc2. CPU returns the present control to S270 when an affirmative determination is made, and resets the flag Fsk to 0 in S300 when a negative determination is made.

Example of the Operation of the Embodiment

Figure 6:
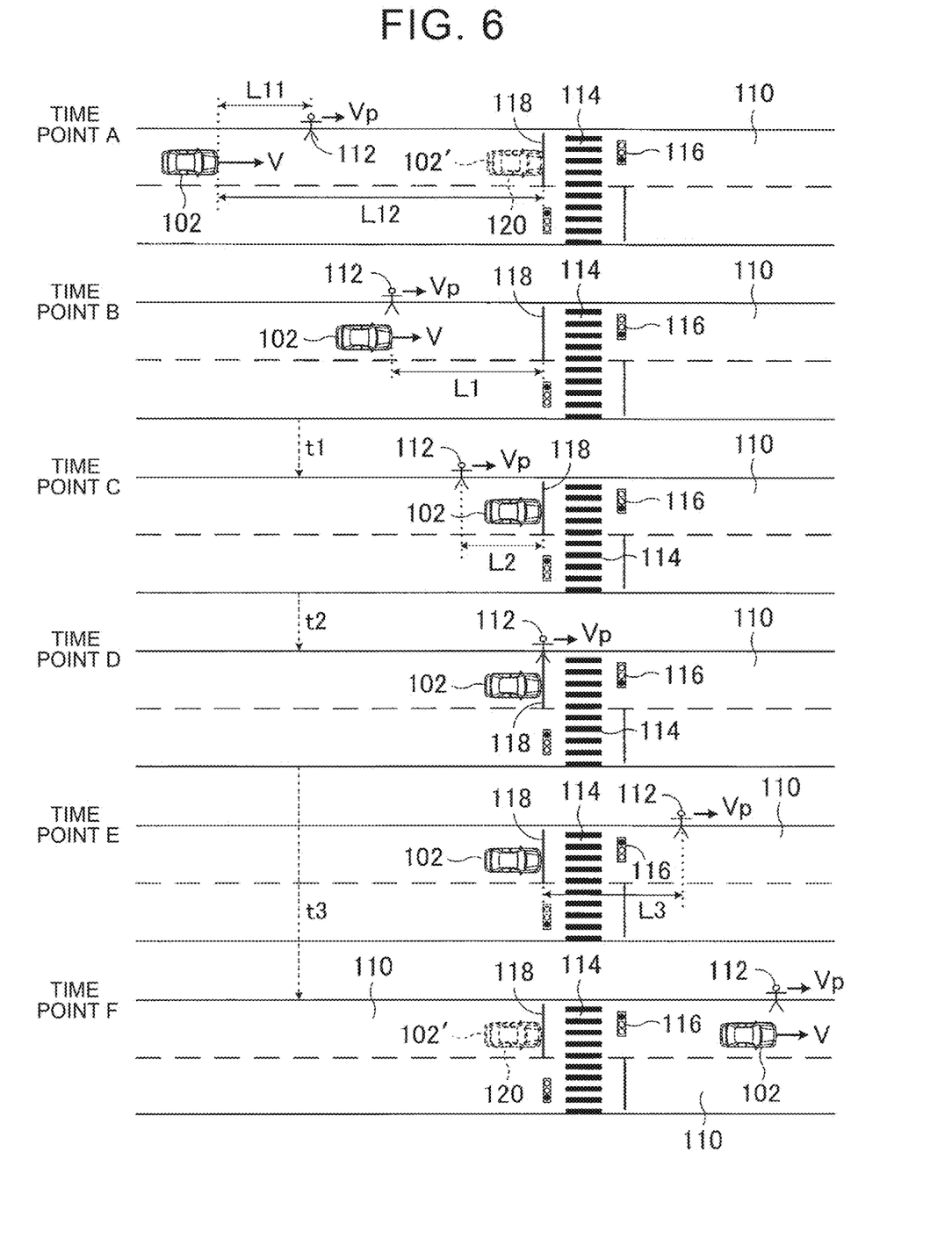
FIG. 6 is a diagram illustrating an example of operation of the embodiment.

FIG. 6 shows a situation in which the vehicle 102 travels on the road 110 on the left side and the pedestrian 112 moves on the left side of the road 110 in the same direction as the vehicle 102. On the road 110, there is a sidewalk 114, and a traffic light 116 is installed on the sidewalk. A stop line 118 is set in front of the sidewalk 114. When the traffic light 116 is red, the traffic signal is to be paused. At time point A in FIG. 6, the position of the vehicle 102' shown in phantom is a predetermined position 120 in front of the object to be paused. Note that, although not shown in FIG. 6, when there is a preceding vehicle that is temporarily stopped, a position behind the temporarily stopped vehicle at a predetermined interval is a predetermined position in front of the object to be temporarily stopped.

The following situations are assumed. At time point A, the traffic light 116 turns red. At time point B, vehicle 102 catches up with pedestrian 112. At time point C, the vehicle 102 stops at a predetermined position 120. At time point D, the pedestrian 112 catches up with the vehicle 102 in the stopped state. Further, at time point E, the pedestrian 112 moves in front of the vehicle 102 in the stopped state. At time point F, the vehicle 102 catches up with the pedestrian 112. In the example described with reference to FIG. 6, the above situation is assumed.

At the time point A, the determination of S10 and S20 becomes negative, and the determination of S30 becomes affirmative. Accordingly, the vehicle 102 is decelerated by executing S50 and S60, and the vehicle 102 is stopped at the predetermined position 120 (time point C). Consequently, the determination of S10 is affirmative, but when the flag Fsk is 0, the determination of S100 and S110 is negative, so that the vehicle 102 is maintained in the stopped condition (S120).

At time point A, the determination of S210 and S220 becomes affirmative, and at S230 and S240, the first time t1 and the second time t2 are calculated, respectively. When the sum t1+t2 of the first time t1 and the second time t2 is less than the reference tc1, an affirmative determination is made in S250, and the flag Fsk is set to 1 in S260. Therefore, since the determination of S100 is affirmative, the vehicles 102 are maintained in the stopped condition (S120).

When the pedestrian 112 catches up with the stopped-state vehicle 102 (time point D) and moves further forward (time point E), the determination of S270 becomes affirmative, and the third time t3 is calculated in S280. When the third time t3 becomes equal to or larger than the reference value tc2, a negative determination is made in S290, and the flag Fsk is reset to 0 in S300. Consequently, since the determination of S100 is a negative determination, for example, when the traffic light 116 is blue and the vehicle 102 may be started, the determination of S110 is an affirmative determination. Therefore, in S130, the flag Fss is set to 1, and in S140, the traveling of the vehicles 102 is started.

S10 determination is a negative determination, and S20 determination is an affirmative determination. Therefore, in S70, the vehicle speed V of the vehicle 102 is controlled to change in the predetermined change pattern A shown in FIG. 4A. Further, when the vehicle speed V of the vehicle 102 increases and reaches the constant speed vehicle speed Vca, the determination of S80 becomes an affirmative determination. Thus, in S90, the flag Fss is reset to 0. Therefore, the determination of S10 and S20 is a negative determination.

As can be seen from the above description, the target detection device 18 may detect the red traffic light 116 as the pause target in front of the own vehicle 102 and detect the pedestrian 112 moving in the same direction as the own vehicle on the front side of the own vehicle. Here, according to an embodiment, the first time t1 and the second time t2 are calculated (S210 to S240). Further, when the sum t1+t2 of the first and second times is less than the first reference value tc1 (S250), even if the object to be paused is not detected by the target detection device, the subject vehicle is maintained in the stopped state (S260, S100, S120).

Therefore, when the sum t1+t2 of the first and second times is small, the host vehicle does not start. That is, when the time from when the own vehicle 102 catches up with the pedestrian 112 until when the pedestrian catches up with the own vehicle is short and the distance between the vehicle and the pedestrian is small, the own vehicle does not start even if the pause target is not detected. Therefore, it is possible to suppress the host vehicle starting in a situation where the distance between the vehicle and the pedestrian is small. Accordingly, it is possible to reduce the possibility that the driver and the pedestrian will be impaired due to the vehicle starting in a situation where the distance between the vehicle and the pedestrian is small.

Further, according to the embodiment, when the third time t3 until the host vehicle 102 catches up with the pedestrian 112 is less than the second reference value tc2 (S280, S290), the host vehicle or the vehicle is maintained in the stopped state (S100, S120). Therefore, it is possible to reduce the possibility that the driver and the pedestrian's sense of security are impaired due to the vehicle starting in a situation where the distance between the vehicle and the pedestrian moving in front of the vehicle is small.

Further, according to the embodiment, a first distance L1 from the position of the own vehicle 102 to the predetermined position 120 when catching up with the pedestrian 112 is estimated (S230). Further, the first temporal t1 is calculated based on the vehicle speed V when the host vehicle catches up with the pedestrian, the target deceleration Gbt of the host vehicle, and the first distance (S230). Therefore, the first time can be estimated based on the first distance, the vehicle speed when the own vehicle catches up with the pedestrian, the target deceleration, and the first distance.

Further, according to an embodiment, a moving speed Vp of the pedestrian 112 is estimated (S240). In addition, the second distance L2 from the pedestrian to the host vehicle when the host vehicle is stopped is calculated (S240). Further, a second temporal t2 is calculated based on the pedestrian travel velocity and the second range (S240). Therefore, the second time can be estimated based on the second distance and the moving speed of the pedestrian.

Further, in a situation where the host vehicle 102 is maintained in a stopped state and the pedestrian 112 is detected on the front side of the host vehicle, a pause target may not be detected. In this case, according to the embodiment, the travel control device 80 is controlled to change the vehicle speed V of the host vehicle in a preset change pattern (FIG. 4A) (S70). Further, a third distance L3 from the own vehicle to the pedestrian when the object to be paused is no longer detected is estimated, and a third time t3 is calculated based on the change pattern, the third distance, and the moving speed Vp of the pedestrian (S280). Therefore, the third time can be estimated based on the third distance from the own vehicle to the pedestrian, the change pattern, and the moving speed of the pedestrian when the pause target is no longer detected.

Further, according to the embodiment, when the vehicle 102 starts after being maintained in the stopped condition, the traveling of the vehicle 102 is controlled so that the vehicle speed V changes in the predetermined change pattern A shown in FIG. 4A. The acceleration and the constant speed vehicle speed Vca of the predetermined change pattern A are smaller than the acceleration and the constant speed vehicle speed Vcb of the predetermined change pattern B in the normal ACC shown in FIG. 4B. Therefore, the acceleration and the speed of the vehicle can be made lower than in the case where the travel of the vehicle 102 is controlled so that the vehicle speed V changes in the predetermined change pattern B. As a result, it is possible to reduce the risk of the driver and the pedestrian being impaired.

The present disclosure has been described in detail above with respect to specific embodiments. However, it is obvious to those skilled in the art that the present disclosure is not limited to the above-described embodiments, and various other embodiments are possible within the scope of the present disclosure.

For example, in the above-described embodiment, in S290, when an affirmative determination is made, control is returned to S270. However, in S290, when an affirmative determination is made, it is determined whether or not there are subsequent vehicles, when a negative determination is made, the control may be returned to S270, and when an affirmative determination is made, the control may be advanced to S300. According to this modification, when there are subsequent vehicles, the flag Fsk is reset to 0, and a negative determination is made in S100. Therefore, even if the traffic light 116 turns blue, it is possible to avoid that the subsequent vehicle cannot start due to the vehicle 102 being maintained in the stopped state.

In the above-described embodiment, S270 to S300 are executed only when the flag Fsk is 1. However, even if the flag Fsk is 0, it may be executed when the vehicle 102 is stopped and there is a pedestrian in the left front of the vehicle.

Further, although the above-described embodiment is applied to the vehicle 102 traveling on the road on the left side, the present disclosure may be applied to the vehicle traveling on the road on the right side. In such cases, it is determined in S220 and S270 whether or not there is a pedestrian moving in the same direction as the vehicle in front of the right side of the vehicle 102.

What is claimed is:

1. A drive assist device comprising:
a target detection device that detects a target around a host vehicle; a travel control device that controls travel of the host vehicle; and a control unit that controls the travel control device, wherein: the control unit is configured to decelerate the host vehicle and stop the host vehicle at a predetermined position before a temporary stop target by controlling the travel control device when the target detection device detects the temporary stop target in front of the host vehicle; and
the control unit is configured to estimate a first time period since when the host vehicle catches up with a pedestrian until when the host vehicle is stopped and estimate a second time period since when the host vehicle is stopped until when the pedestrian catches up with the host vehicle when the target detection device detects the temporary stop target in front of the host vehicle and detects the pedestrian moving at a side in front of the host vehicle in a same direction as the host vehicle, and to maintain the host vehicle in a stopped state by controlling the travel control device, even if the target detection device does not detect the temporary stop target any more, when a sum of the first and second time periods is less than a first reference value.

2. The drive assist device according to claim 1, wherein the control unit is configured to estimate a third time period until the host vehicle catches up with the pedestrian when the target detection device does not detect the temporary stop target any more in a situation in which the host vehicle is maintained in the stopped state and the target detection device is detecting the pedestrian at a side in front of the host vehicle, and to continue to maintain the host vehicle in the stopped state when the third time period is less than a second reference value.

3. The drive assist device according to claim 1, wherein the control unit is configured to estimate a first distance from a position of the host vehicle at a time when the vehicle catches up with the pedestrian to the predetermined position, and estimate the first time period based on a vehicle speed at the time when the host vehicle catches up with the pedestrian, a deceleration of the host vehicle, and the first distance.

4. The drive assist device according to claim 1, wherein the control unit is configured to estimate a moving speed of the pedestrian, estimate a second distance from the pedestrian to the host vehicle at a time when the host vehicle is stopped, and estimate the second time period based on the moving speed of the pedestrian and the second distance.

5. The drive assist device according to claim 2, wherein the control unit is configured to control the travel control device such that a vehicle speed of the host vehicle is varied in a variation pattern set in advance when the target detection device does not detect the temporary stop target any more in a situation in which the host vehicle is maintained in the stopped state and the target detection device is detecting the pedestrian at a side in front of the host vehicle, and configured to estimate a third distance from the host vehicle to the pedestrian at a time when the target detection device does not detect the temporary stop target any more, and estimate the third time period based on the variation pattern, a moving speed of the pedestrian, and the third distance.

* * * * *